Oct. 21, 1969  F. HALEY  3,473,830
COUPLING FOR FLANGED PIPE
Filed Feb. 23, 1968  7 Sheets-Sheet 1
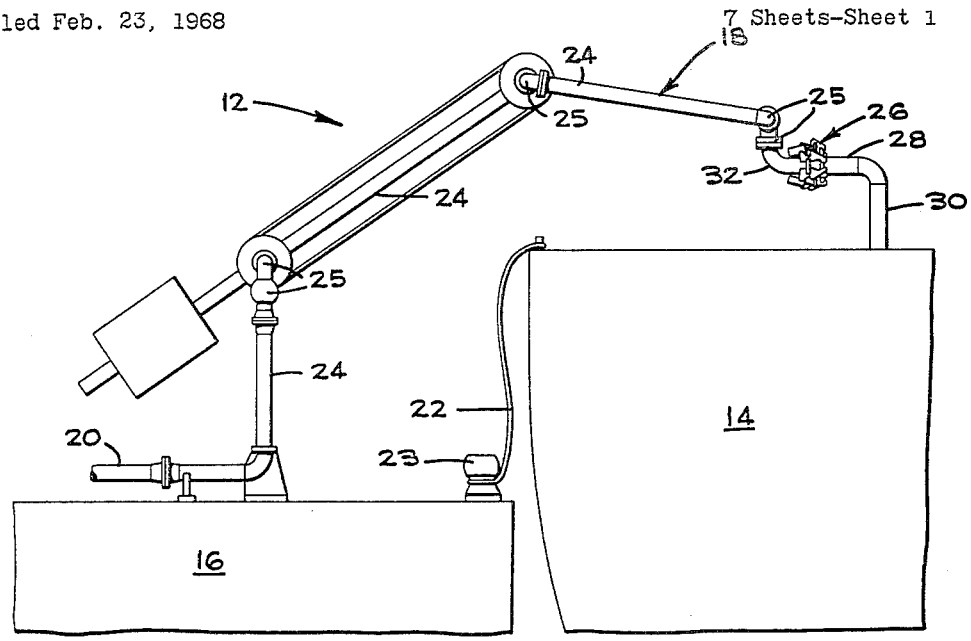
FIG_1
FIG_2
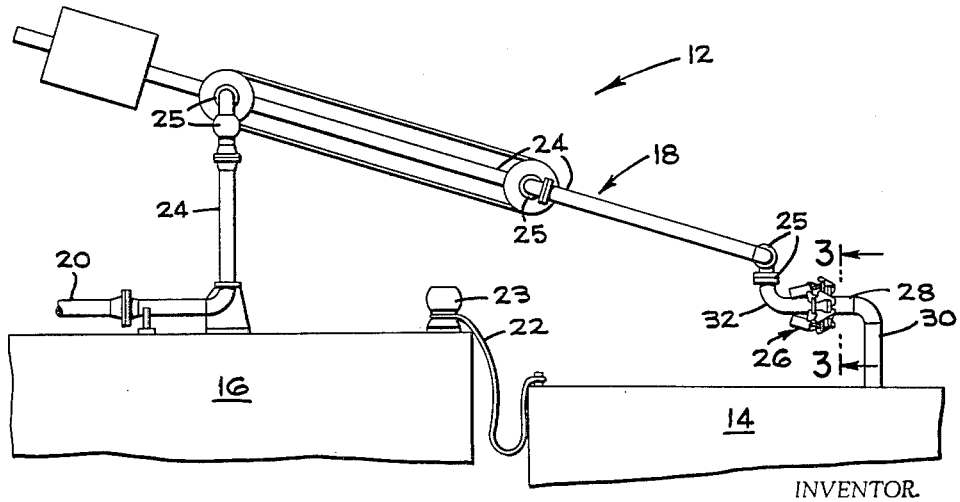
INVENTOR.
FRANK HALEY
BY F. W. Anderson
C. E. Tripp
ATTORNEYS

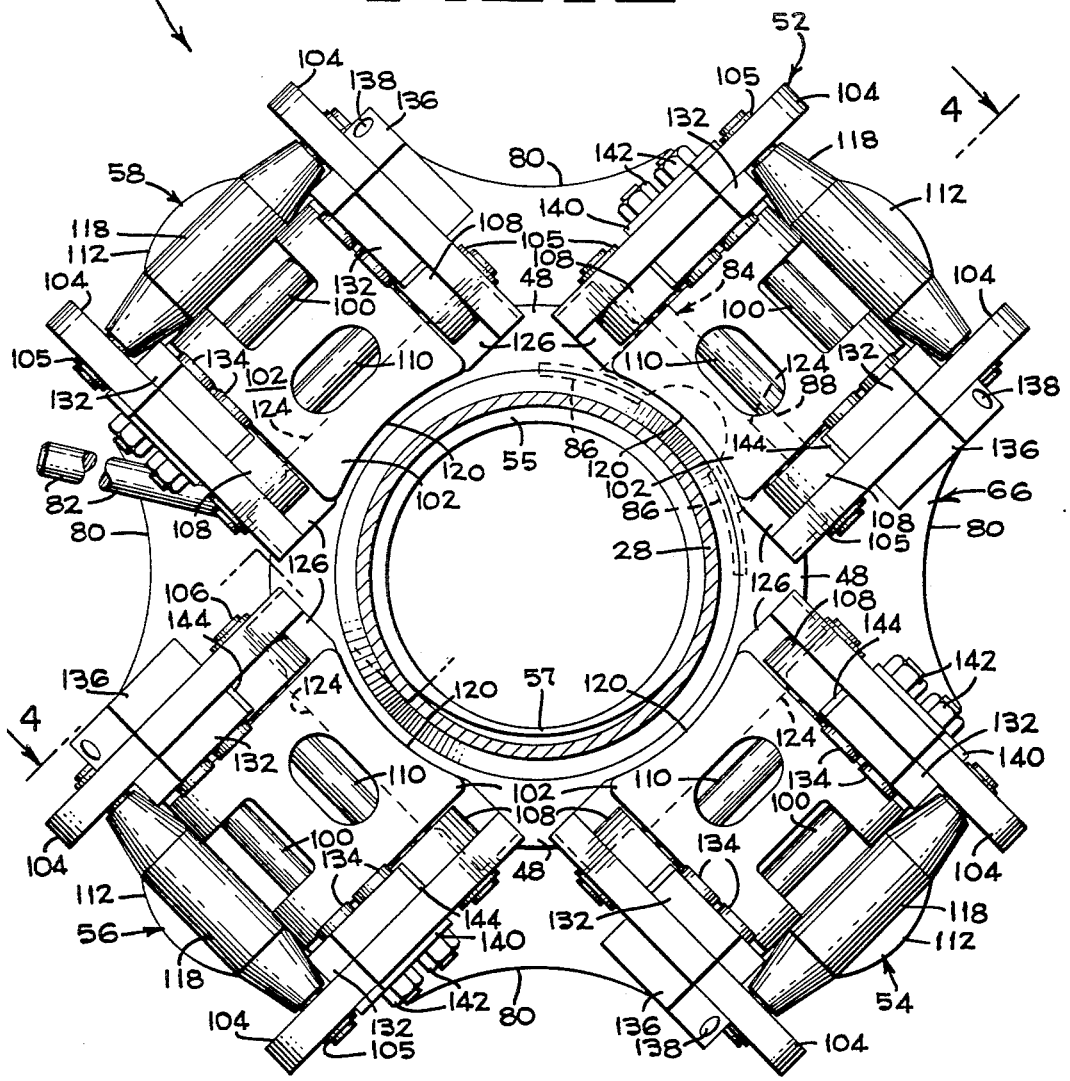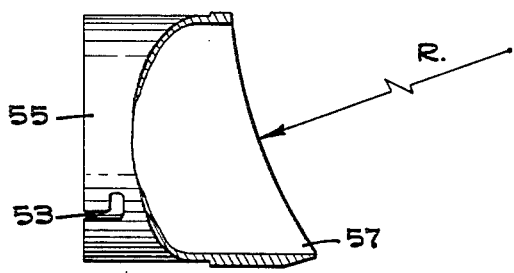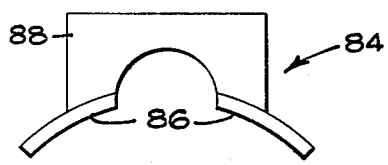

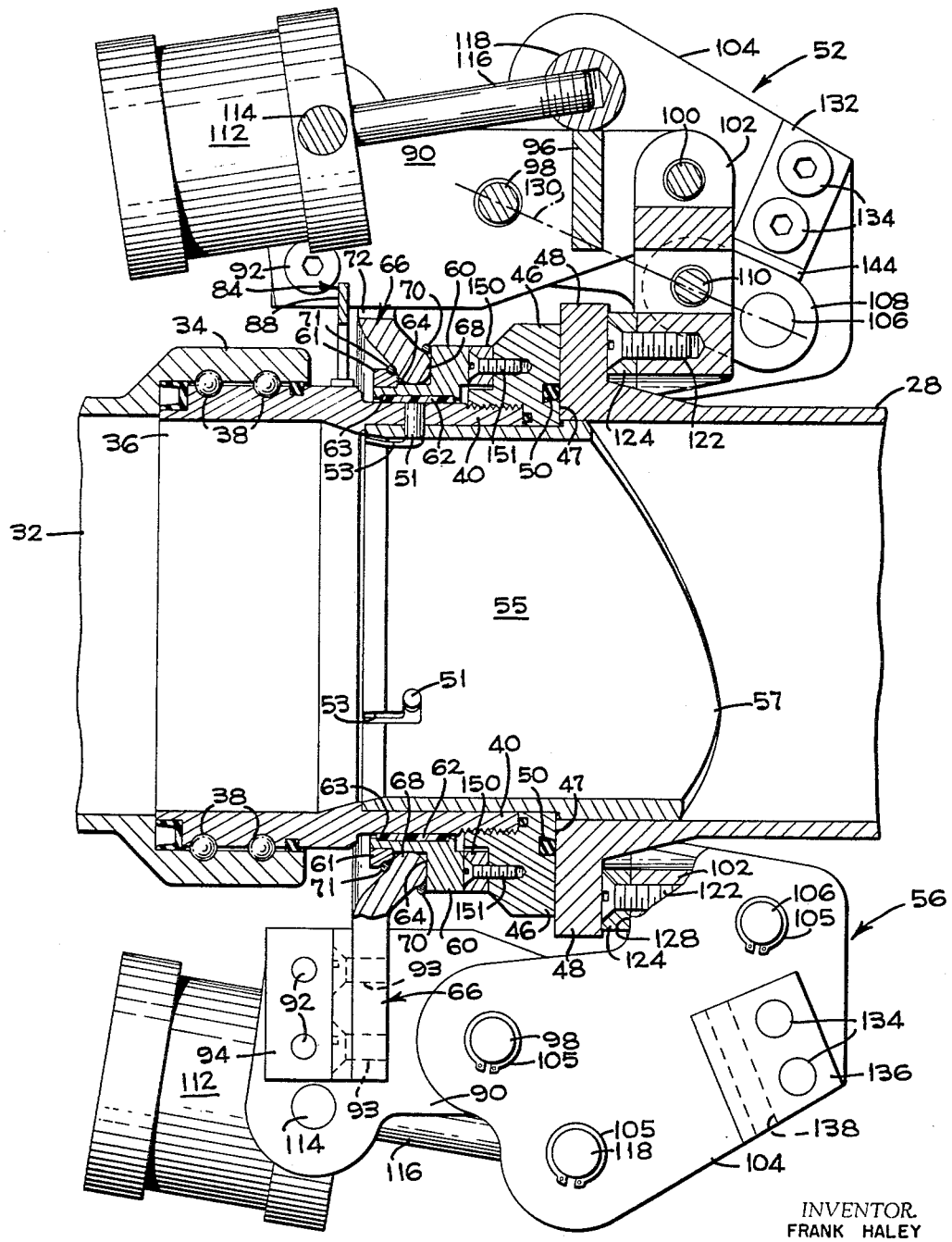

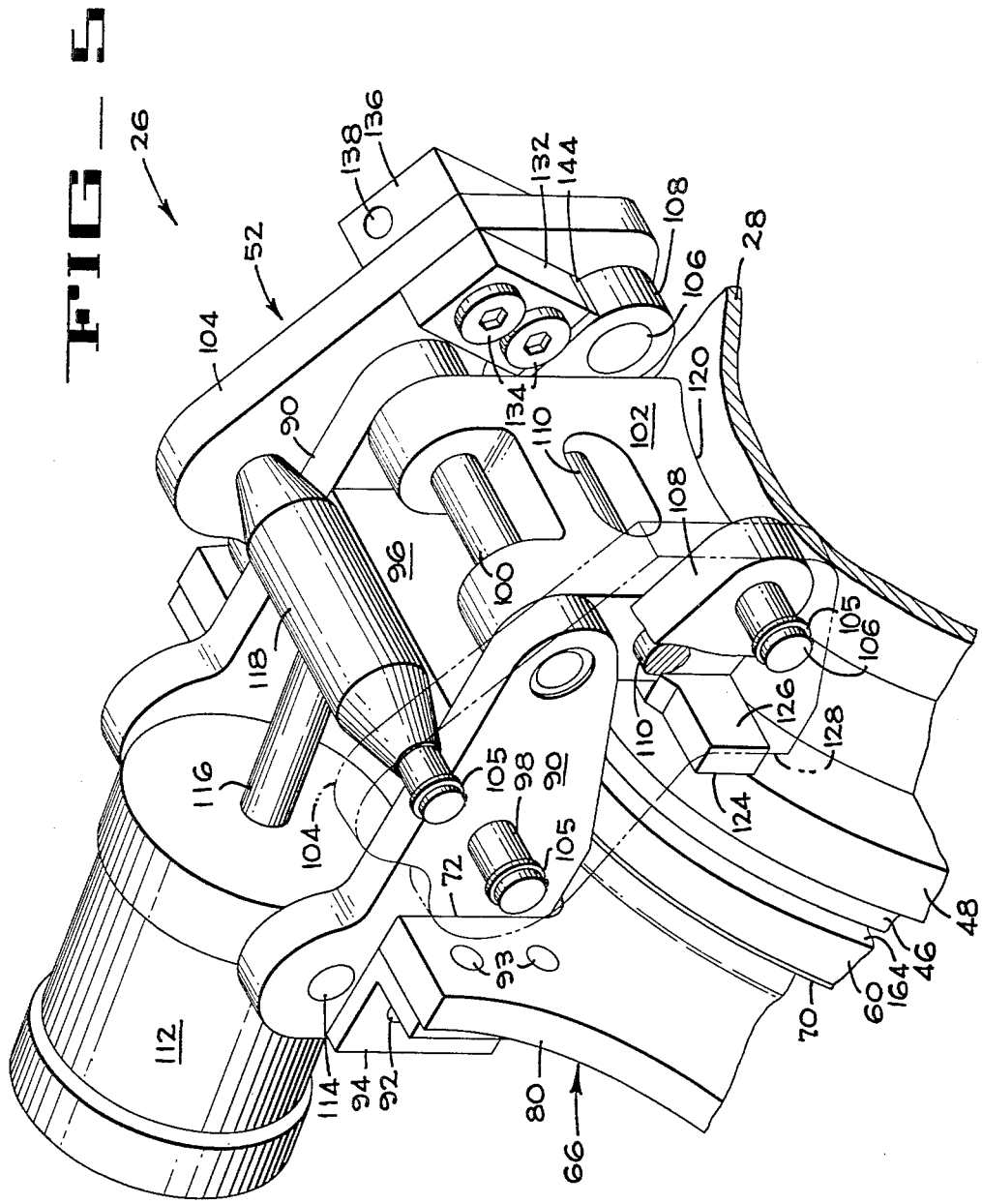

Oct. 21, 1969   F. HALEY   3,473,830
COUPLING FOR FLANGED PIPE
Filed Feb. 23, 1968   7 Sheets-Sheet 5
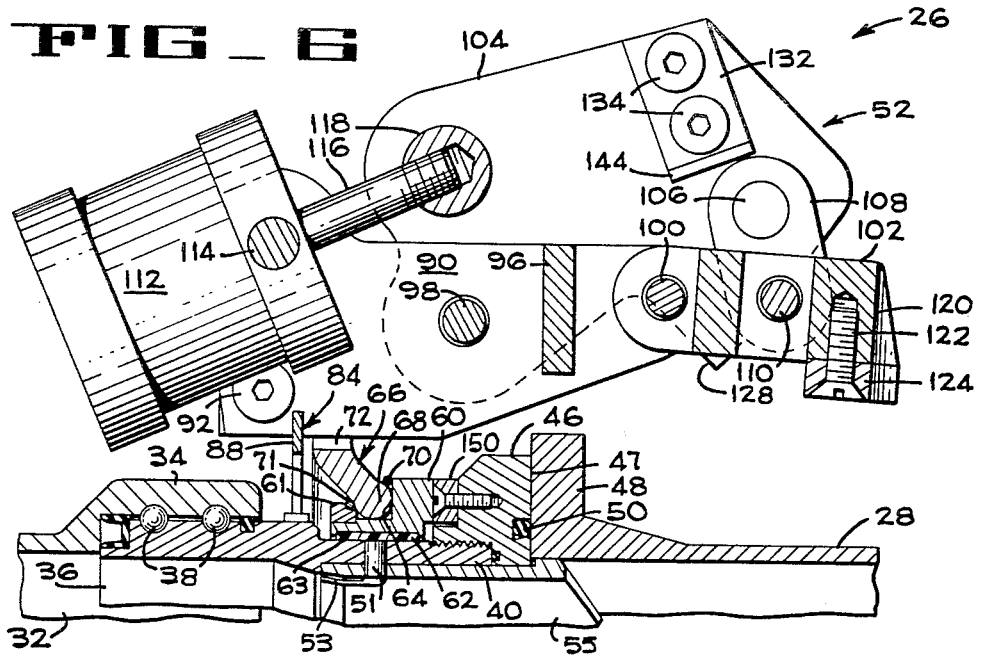
FIG_6
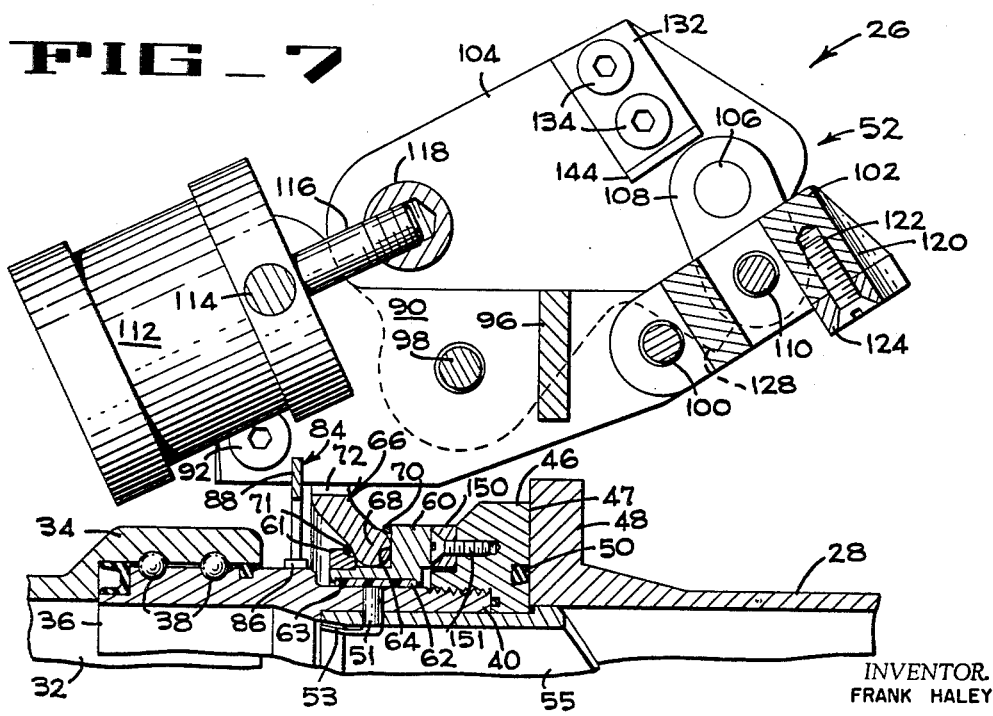
FIG_7
INVENTOR.
FRANK HALEY
BY F. W. Anderson
C. E. Tripp
ATTORNEYS Oct. 21, 1969         F. HALEY                3,473,830
                 COUPLING FOR FLANGED PIPE
Filed Feb. 23, 1968                    7 Sheets-Sheet 6
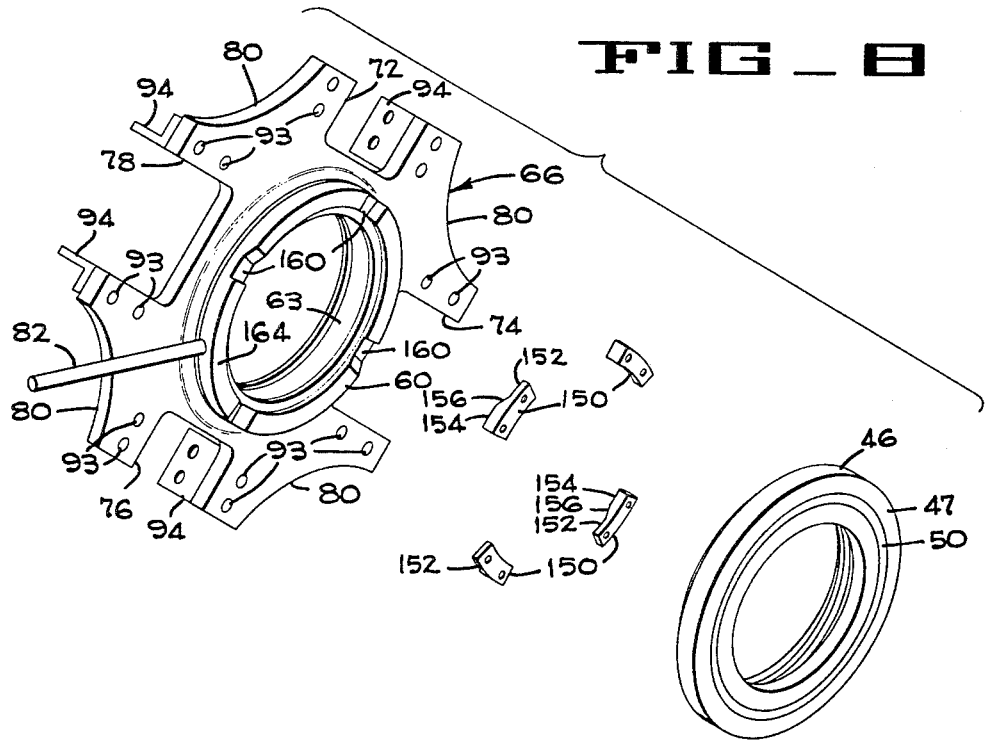
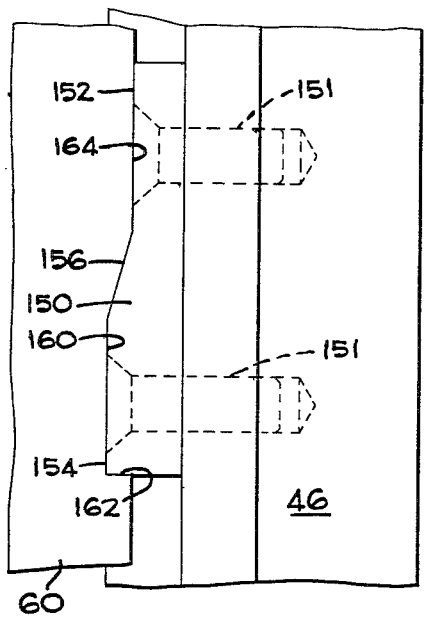
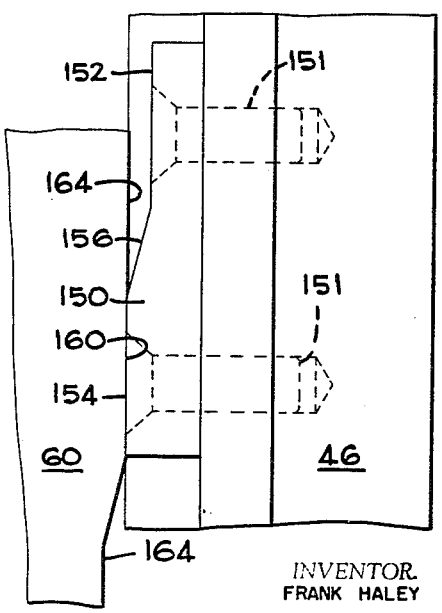
INVENTOR.
FRANK HALEY
BY F. W. Anderson
   C. E. Tripp
            ATTORNEYS

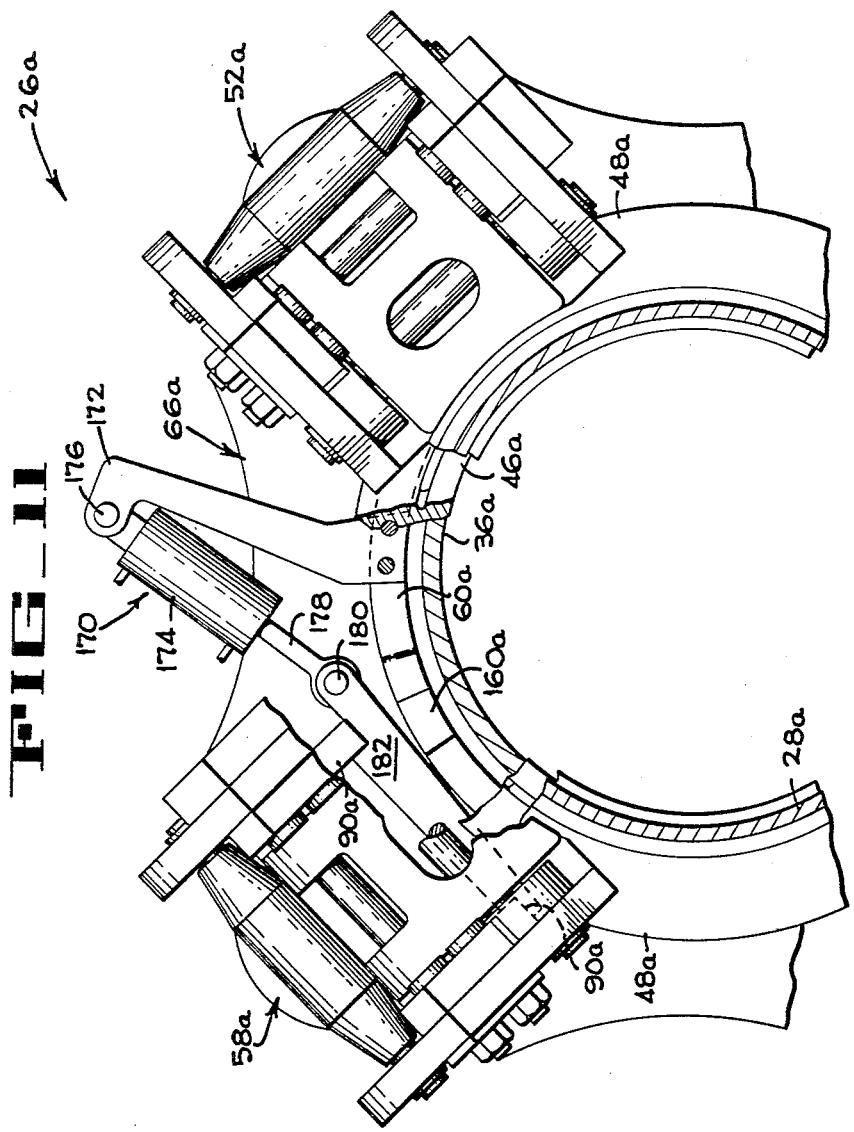

United States Patent Office 3,473,830
Patented Oct. 21, 1969

3,473,830
COUPLING FOR FLANGED PIPE
Frank Haley, Upland, Calif., assignor to FMC Corporation, San Jose, Calif., a corporation of Delaware
Filed Feb. 23, 1968, Ser. No. 707,721
Int. Cl. F16l 55/00, 35/00
U.S. Cl. 285—24                                6 Claims

ABSTRACT OF THE DISCLOSURE

A pipe coupling is provided with a Belleville spring which carries four power-actuated clamps having clamping pads arranged to force a pipe flange into face-sealing engagement with an annular flange of the coupling. The inner edge of the spring is mounted in a rotatable ring having surfaces which react against fixed cams to axially regulate the interspacing of the spring and said annular flange to accommodate both ASA and metric pipe flanges of different thicknesses. Toggle linkage connected to the clamping pads is preloaded by the spring to maintain clamping pressure after the clamping power to the clamping pads is released.

Background of the invention

The present invention pertains to a boltless power-actuated coupling for connection to a flanged pipe section. More specifically, the invention is of special utility in connecting a marine loading arm to a flanged connector on the manifold of a cargo ship preparatory to transferring liquid cargo to or from the ship through the loading arm. When used with a marine loading arm, this general type of coupling is subject to dynamic stresses peculiar to such use.

In general, a marine loading arm can comprise an articulated assembly of large conduits that is mounted on a dock. The flanged, free end of the conduit assembly is connected, usually by bolts, to a corresponding flange on a manifold of a tank ship moored alongside the dock. The loading arm may be in fluid communication with a storage tank, for instance, to transfer fluid to or from the tank ship through the loading arm. Due to motion of the ship from wind and tide, the weight of the fluid being transferred and other conditions, large, multi-directional forces are developed at the connection of the loading arm to the manifold. In conventional, bolted connections, these forces are resisted by numerous bolts.

In the case of boltless, power actuated couplings of the present type, a general problem is to achieve and maintain substantially total circumferential clamping action for resisting operational forces tending to separate the connection. Further, it is desirable to maintain such clamping action without power so that the coupled connection will not release in the event of a power failure. Another desirable feature is to provide rapid adjustment means within the coupling so that standard ASA and metric flanges, and thickness variations of the same, can be readily coupled without auxiliary adapters. In some instances it is advantageous where batteries of loading arms are controlled from a single control station on the dock, to be able to remotely preadjust each coupling to match the particular type of flange on an incoming ship. All of the foregoing are objects and results achieved by the coupling of the present invention.

Summary of the invention

Power actuated, spring sustained clamping action is achieved by mounting toggle-link clamps on a Belleville spring which is tensioned during power-positioning of the toggle links to an over center position so that the spring supplies clamping pressure when the power means is inactivated. Circumferentially spaced cams are provided between the spring and an annular clamping face of the coupling to adjust the clamps and spring toward or away from said face to accommodate various thicknesses of pipe flanges.

Brief description of the drawings

FIGURES 1 and 2 are diagrammatic elevations showing two possible positions of a marine loading arm incorporating the pipe coupling of the present invention.

FIGURE 3 is an enlarged section taken along lines 3—3 on FIGURE 2.

FIGURE 3A is an elevation, partly broken away, of a centering member which facilitates alignment of the coupling with a pipe section prior to sealing one to the other.

FIGURE 3B is an elevation of a locking member which prevents relative rotation between certain parts of the coupling assembly.

FIGURE 4 is a slightly enlarged transverse section taken along lines 4—4 on FIGURE 3.

FIGURE 5 is a fragmentary perspective of one of the power actuated clamp assemblies shown in FIGURES 3 and 4.

FIGURES 6 and 7 are fragmentary sections similar to the upper portion of FIGURE 4, and in conjunction with FIGURE 4 illustrate successive positions of a clamp being actuated from a closed coupling position, to an open uncoupling position.

FIGURE 8 is an exploded perspective of the clamp mounting spring and associated structure for adjusting the position of the clamps along the axis of the coupling.

FIGURES 9 and 10 are enlarged fragmentary sections illustrating the two limits of movement of one of the camming arrangements shown in FIGURE 8.

FIGURE 11 is a transverse section, similar to FIGURE 3, showing a second embodiment of the invention wherein power cylinders capable of being remotely actuated adjust the clamps to accommodate different thicknesses of pipe flanges.

Description of the preferred embodiments

A typical dock installation 12 (FIGS. 1 and 2) for transferring liquid cargo to or from the tanks of a ship 14 includes a dock 16, at the edge of which is mounted one or more marine loading arms 18. The ship 14 is shown in an empty condition in FIGURE 1, and in FIGURE 2 is fully loaded and settled in the water after the cargo is moved through a pipe 20 into the ship by shore based pumps, not shown.

The ship is secured by a hawser 22 to a bollard 23, and other hawsers and bollards, after which the loading arm 18 is maneuvered to achieve relative angular motion between its pipe sections 24 and its pivotal interconnections at 25, such that a coupling assembly 26 on the free end of the loading arm is aligned with and can be connected to a flanged pipe section 28 of the ship's manifold 30. In most prior loading arm devices, the connection of the loading arm 18 to the pipe section 28 is by means of bolts extending through a pair of pipe flanges. Both the coupling and the uncoupling operations in bolted assemblies obviously require a relatively long time.

The present invention concerns only the coupling 26 and provides power-actuated clamps which can be remotely actuated to effect a fluid-tight seal between the pipe section 28 and the loading arm.

As the ship 14 is loaded, its freeboard diminishes so that it is lowered relative to the dock 16. This causes the pipe sections 24 of the loading arm to assume a more lineal alignment, and the hawser 22 to become more slack. If the slack hawser is not tightened, the vessel can drift away from the dock and develop very high misalignment and separation forces between the coupling 26 and the pipe section 28.

The coupling 26 maintains a strong interconnection without the application of any power after the clamping action is effected so that the integrity of the seal is maintained in the event of power failure. At the same time, the coupling can readily be detached, either under power or by manual actuation, if the forces tending to misalign or separate the coupling appear to make leakage or damage to the loading arm imminent, such as could be the case if the ship drifted farther from the dock than in its FIGURE 2 position. It will be understood that FIGURES 1 and 2 do not depict actual dimensional relations, but only diagrammatically emphasize operational conditions.

FIGURES 3 and 4 show the coupling assembly 26 secured to the pipe section 28 of the vessel's manifold. The coupling assembly includes a 90-degree swivel joint elbow 32 (FIGS. 1 and 2) which forms the last conduit section of the loading arm. The elbow 32 (FIG. 4) has a bell end 34 which rotatably mounts a tubular coupling member 36 by means of ball bearings 38 which lie in complementary bearing races of the elements 34 and 36.

The tubular coupling member 36 is provided with a neck 40 having a threaded end portion that is engaged with an interiorly threaded annular coupling flange 46. The outer end surface 47 of the flange 46 defines, in conjunction with the end surface of the pipe flange 48 on the ship, a sealing interface that includes an O-ring seal 50 which is seated in a groove formed in the coupling flange 46.

In order to facilitate concentric alignment of the coupling flange 46 (FIG. 4) with the pipe flange 48 on the ship when the initial coupling action is effected, the neck 40 of the tubular coupling member 36 is provided with inwardly directed, fixed pins 51 which are adapted to lock in conventional manner in J-slots 53 that are formed in a tubular guide nose 55. As best shown in FIGURE 3A, the free end portions of the guide nose 55 is cut away on a uniform radius R so that the thus formed lower portion at 57 forms (viewed in plan) a smoothly tapered, rounded nose. As this nose portion is inserted into the pipe section 28, any misalignment of the coupling can be visually ascertained and corrected, the coupling thus being brought into rapid concentric relation with the pipe flange 48. It will be noted that the apparently different end configuration of the guide nose 55 as viewed in FIGURE 4 is due to the section plane for FIGURE 4 being angularly related to a vertical plane.

The coupling flange 46 is clamped to the pipe flange 48 by four hydraulically-powered clamp assemblies 52, 54, 56 and 58, all of which are of identical construction. With later reference to FIGURE 4, the clamp assemblies 52 and 56 are described in detail. Similar parts in all of the clamp assemblies are identified by the same reference numerals.

Means mounting the clamp assemblies 52-56 on the tubular neck 40 includes a mounting ring 60, which is spaced from the neck by a flat Teflon bearing ring 62 mounted in an interior relief 63. The mounting ring is capable of limited rotation on the neck. Such rotation, later mentioned in connection with FIGURES 8-10, adjusts the axial position of the mounting ring 60 relative to the flange 46. The purpose of this adjustment is to simultaneously preset the axial positions of the clamp assemblies 52-56 to accommodate other pipe flanges 48 having other thicknesses.

The mounting ring 60, in conjunction with a locking ring 61 that is secured to the mounting ring, defines an outwardly open circumferential groove 64. The purpose of the groove 64 is to axially position a Belleville spring 66 in a manner permitting free rotation of the mounting and locking ring assembly. To this end, the Belleville spring 66 defines a circular aperture having a rim 68 of partially circular section that is axially locked in the groove 64. In order to retain a lubricant in the groove 64, resiliently tensioned O-rings 70 and 71 are installed against the rim 68 to seal the otherwise exposed outer portions of the groove.

As best shown in FIGURE 8, the Belleville spring 66 is provided with four equally spaced, radially extending notches 72, 74, 76 and 78 which respectively provide mounting clearance for the clamp assemblies 52, 54, 56 and 58. Intermediate the notches, the Belleville spring is provided with concave edge portions 80 which concentrate spring flexure to the portions of the spring which adjoin the notches 72-78. The mounting ring 60 is provided with a radially projecting handle 82 in order to rotate the mounting and locking ring assembly on the tubular neck 40 (FIG. 4).

Rotation of the Belleville spring 66 relative to the tubular neck 40 is prevented by a locking member 84 (FIGS. 3 and 3B) which includes arcuate base flanges 86 that are bolted, by bolts not shown, to the tubular coupling member 36, and an inverted generally U-shaped plate 88 upstanding from the flanges 86. The locking member 84 is positioned so that the plate 88 extends between the two clamp mounting plates 90 (FIG. 5) of the clamp assembly 52, thereby holding that assembly and the Belleville spring on which it is mounted from rotation.

Each of the clamp assemblies 52, 54, 56 and 58 includes a pair of the mounting plates 90 that are secured to the Belleville spring 66 via bolts 92 threaded into a pair of angle supports 94 (FIGS. 5 and 8), and bolts 93 extending through the Belleville spring 66 into threaded apertures in supports 94. The supports straddle the notches, 72, 74, 76 and 78 in the spring so that each clamp assembly is positioned and operates within one of the notched and relatively flexible portions of the spring.

With particular reference to the clamp assembly 52 shown in FIGURES 4-7, the two mounting plates 90 are interconnected by a tie bar 96, a pivot shaft 98, and a pivot shaft 100. A clamp arm 102 is pivoted on the pivot shaft 100 for swinging movement between the spaced apart mounting plates 90. The pivot shaft 98 extends laterally beyond each mounting plate 90 and through end portions of two pivot plates 104. The pivot plates 104 indirectly actuate the clamp arm 102. For this purpose, each pivot plate carries a pivot stud 106 which is welded in one end portion of a short toggle link 108. The other end portion of each toggle link 108 is mounted on the projecting end of a pivot shaft 110 that extends through the clamp arm 102. All of the various pivot shafts and similar parts are axially retained in position by conventional snap rings 105.

Power means for moving the pivot plates 104 of the clamp assembly 52 in either direction between the extremes of movement shown in FIGURES 4 and 7 is effected by a double acting hydraulic cylinder 112. Cylinder 112 is provided with laterally aligned trunnions 114 that are rotatable in apertures of the mounting plates 90. The piston rod 116 of the cylinder 112 has a threaded end portion engaged with a threaded aperture in a tie rod 118 having end portions rotatably mounted in the pivot plates 104. It will be noted that the tie bar 96 (FIG. 4) lies beneath the tie rod 118 in a position which can limit further extension of the piston rod 116 and further clockwise pivotal movement of the pivot plates 104 about the axis of the pivot shaft 98.

Referring now to FIGURES 3-5 and details of the clamp arm 102, the free end of the clamp arm is arcuate at 120 so as to conform to the adjacent arcuate section of the pipe flange 48. Affixed by machine screws 122 to the inner face of the clamp arm 102 is a clamp pad 124 which provides pressure contact with the pipe flange 48. As shown in FIGURE 3, the clamp pad 124 has an arcuate edge aligned with the edge 120 of the clamp arm 102, and has end portions 126 which extend laterally into the planes of movement of the two pivot plates 104. Each pivot plate 104, as indicated for the plate 104 (FIG. 4) for the clamp assembly 56, is provided with a linear locking edge portion 128 which, when the clamp assembly is closed, contacts the adjacent end portion 126 of the clamp pad 124. This makes effective not only the clamp pad portion which is backed up by the clamp arm 102, but the entire length of the clamp pad. As shown in FIGURE 3, the ends 126 of adjacent clamp pads 124 are closely spaced from one another, whereby the clamping action achieved is substantially continuous around the contacted face of the pipe flange 48.

When the clamp assemblies are in their closed, clamping positions illustrated in FIGURES 4 and 5, an over-center or toggle action condition exists because the axis of the pivot shaft 110 lies outwardly beyond a plane 130 which bisects the pivot shaft 98 and the pivot stud 106. Accordingly, even though the cylinder 112 may be de-energized, forces tending to axially separate the pipe flange 48 and the coupling flange 46 tend to pivot the inner end portion of the toggle link 108 outward about the axis of the pivot stud 106. To prevent an excessive amount of such movement beyond the amount required to achieve a positive over-center lock, the toggle link 108 is stopped in over-center position by a stop block 132 that is bolted to the pivot plate 104.

One of the two stop blocks 132 associated with the pair of toggle links 108 has its attachment bolts 134 threaded into a handle socket 136 which lies against the outer face of the pivot plate 104. The socket is provided with an aperture 138 that is adapted to receive a handle, not shown, whereby the clamp assembly can be manually actuated. The other attachment bolts, as shown in FIGURE 3, extend through a washer plate 140 and are secured by nuts 142. In order to precisely adjust the over-center positions of the toggle links 108, each of the stop blocks 132 is provided with a removable face plate 144, and has removable shims, not shown, between the face plate and the stop block.

At this point, reference is made to the operation of the Belleville spring 66 and its cooperation with the previously mentioned cam-adjusted positioning of the clamp assemblies to accommodate pipe flanges similar to the pipe flange 48 but having different thicknesses. Four equally-spaced face cams 150, FIGURE 8, are secured by machine screws 151 to an inner face of the coupling flange 46, in the manner clearly shown in FIGURES 4–7. As shown in FIGURES 8–10, each cam 150 has two operative surfaces and two operative positions; a first operative surface 152 at its thinner end, and a second operative surface 154 at its thicker end. These surfaces are interconnected by a camming surface 156.

Cooperating with the fixed face cams 150 are complementary recesses 160, in the confronting end face of the rotatable mounting ring 60, which are adapted to coextensively engage the cam surfaces 154 and the camming surface 156 as shown in FIGURE 9. Thus, when the handle 82 (FIG. 8) is raised to its upper limit of movement, as governed by the thick end of each cam striking an end wall 162 (FIG. 9) of the recess 160, the mounting ring 60 is spaced from the coupling flange 46 a distance corresponding to the thickness of the thin end of the cam 150. By referring to FIGURE 4, it will be seen that this places the clamp pads 124 a maximum distance from the coupling flange 46 so as to accommodate one of the thickest pipe flanges 48.

FIGURE 10 shows the opposite extreme of adjustment which is effected by moving the handle 82 (FIG. 8) only about 15 degrees to its lower limit of movement (limited by contact of the handle with the adjacent clamp mounting plate 90) whereby each cam 150 (FIG. 10) has its cam surface 154 positioned against the outer end face 164 of the mounting ring 60. The mounting ring 60 is thus spaced at its maximum distance from the coupling flange 46, causing the clamp pads 124 (FIG. 4) to be positioned to accommodate one of the thinnest pipe flanges 48.

In either adjusted position of the clamp assemblies 52, 54, 56 and 58, the closed position of the clamps causes a slight flexure of the Belleville spring 66 so that when the cylinder 112 is deenergized after clamping, the force of the spring maintains a clamping pressure. In this regard, it may be mentioned that in a coupling assembly for 10 inch pipe, the Belleville spring is about ⅞ of an inch thick and is capable of flexing about ¼ of an inch in addition to its above-described preload flexure. Thus, one adjusted position of the clamps will preset the coupling to handle ASA pipe flanges and variations ⅛ of an inch thicker or thinner, and in the other adjusted position to handle metric pipe flanges and variations ⅛ of an inch thicker or thinner.

None of the above conditions reduces the minimum preload force of the Belleville spring. If the full minimum preload force is not required, it will be evident that in either position of the clamps, even thinner ASA or metric flanges can be handled. For this reason it may in some instances be desirable to have the Belleville spring effect a relatively high preload force that can be safely reduced if an extraordinarily thin flange must be clamped to the coupling. In this manner and as a general example, if the Belleville spring flexes ⅛ of an inch during preload and can flex another ¼ of an inch to accommodate the thickest flange, but will be satisfactorily preloaded with only ¹⁄₁₆ of an inch initial flexure, flanges varying as much as ⁵⁄₁₆ of an inch in thickness can be effectively coupled.

FIGURES 6 and 7 illustrate successive operational positions, intermediate and fully open, of the clamp 52 (FIG. 4) when the power cylinder 112 is energized to retract its piston rod 116. These movements will allow the coupling to be maneuvered away from the pipe section 28, and viewed in reverse order are the movements made to effect the initial coupling action.

As the piston rod 116 is retracted from the FIGURE 4 to the FIGURE 6 position, the pivot plate 104 swings upward about the axis of the pivot shaft 98, thereby immediately elevating the pivot stud 106 (FIG. 4) relative to the plane 130. Consequently, it will be seen that, due to the lever distances involved, only a small amount of piston rod retraction releases the clamping pressure, and only a relatively small further retraction places the clamping pad 124 outside the radial extent of the flange 48 so that the coupling can be withdrawn by the loading arm to which it is attached. Fully open, the clamp pad 124 (FIG. 6) and associated parts lie far from the axis of the coupling to prevent inadvertent damage to the coupling during the time the coupling is maneuvered into clamping position. When aligned, however, the clamp pad is capable of being rapidly positioned against the pipe flange 48, flexing the Belleville spring 66 to preload the spring, and lock up "over center" as shown in FIGURE 4 so that the cylinder 112 can be deenergized and the fluid transfer operation can begin.

It is to be particularly noted that forces which tend to separate the pipe flange 48 from the coupling flange 46 will not release the clamping action even though the cylinder 112 is deenergized. Thus, when the clamp 52 is in its closed FIGURE 4 position, the pivot shaft 110 lies slightly above the plane 130 that bisects the pivot shaft 98 and the pivot studs 106 so that a force applied outward against the clamp pad 124 tends to lift the pivot shaft 110. Since the stop blocks 132 resist such movement, and because the tendency of such movement is to pivot the pivot plates 104 further toward a closed, clamping position, it is not necessary to maintain the hydraulic pressure extending the piston rod 116. It will be apparent that the clamp can readily be manually opened, when the piston 112 is deenergized, by inserting a bar in the aperture 138 of the handle socket 136, and pushing the bar toward the cylinder 112.

FIGURE 11 illustrates a second embodiment of the invention in a larger size of coupling assembly 26a, the main differences being only dimensional from the coupling 26 already described. Accordingly, the same reference numbers with the suffix a are used for the corresponding parts of the coupling 26a. As previously mentioned, it is in some instances desirable to be able to remotely adjust the coupling for a given thickness of pipe flange instead of relying on the manual adjustment effected by moving the handle 82 (FIG. 3), and the FIG. 11 embodiment incorporates this remote adjustment feature. Thus the pipe section 28a, which includes the pipe flange 48a that is in sealing engagement with the coupling 26a, is of 16-inch size whereas the pipe section 28 is of 10-inch size.

Because the coupling 26a is proportionately dimensioned to accommodate the larger pipe, this provides adequate lateral clearance between any pair of the clamp assemblies 52a, 54a, 56a and 58a (only two assemblies being shown) to install a power unit 170 for remotely adjusting the coupling. The mounting ring 60a, which carries the Belleville spring 66a, is provided with a generally radial driven arm 172 which can extend, adjacent one of the cam recesses 160a, outward between any two of the clamp assemblies, but here illustrated in FIGURE 11 between the clamp assemblies 52a and 58a.

A hydraulically actuated power cylinder 174 is pivoted at 176 to the arm 172, and the piston rod 178 of the cylinder is connected by a pivot 180 to a fixed frame anchor plate 182. The anchor plate 182 is secured between the two mounting plates 90a of the clamp assembly 58a in approximate alignment with the arm 172. The clamp assembly 52a, or one of the other clamp assemblies, is directly anchored to the coupling member 36a in the same manner the locking member 84 (FIG. 4) directly anchors the clamp assembly 52 to the coupling member 36. Therefore, when actuation of the power cylinder 174 to extend the piston rod 178 rotates the mounting ring 60a, the mounting ring is axially positioned to adjust the clamp assemblies longitudinally so that different thickness pipe flanges can be clamped to the coupling. As illustrated, the mounting ring is positioned so that the clamp assemblies will accommodate a thin flange, whereas full piston rod extension adjusts the mechanism for a thick flange.

In summary of some of the novel features of the invention, it should again be noted that the cooperative association of the Belleville spring 66, the adjustment cams 150, and the axially movable mounting ring 60 provides rapid adjustment of the clamp assemblies to accommodate a wide variety of different thickness pipe flanges. Further, the clamping action achieved provides substantially total circumferential effectiveness due to the cooperation of the linear locking edge portions 128 of the pivot plates 104 with the end portions 126 of the clamping pads 124. At the same time, forces tending to separate a pipe flange 48 from the coupling flange 46 not only are resisted by the over-center links 108, but the links tend to pivot in a direction (outward about the pivot studs 106) which actually increases the clamping pressure. The Belleville spring 66 flexes to accommodate minor variations in flange thickness and to effect a preload on the clamps that maintains clamping pressure in the absence of hydraulic pressure to the cylinder 112. However, the coupling can be readily disconnected without power by manually pivoting the pivot plates 104 with a bar inserted in the handle socket 136.

Although the best mode contemplated for carrying out the present invention has been herein shown and described, it will be apparent that modification and variation may be made without departing from what is regarded to be the subject matter of the invention.

Having completed a detailed description of the invention so that those skilled in the art could practice the same, I claim:

1. A pipe coupling comprising a tubular coupling member, a coupling flange secured to one end portion of said coupling member and having a planar end face, a mounting ring axially and rotatably movable on said coupling member, a resiliently flexible spring plate encircling said coupling member and mounted on said mounting ring for relative rotation thereto, means for preventing rotational movement of said spring plate relative to said coupling member, cam means responsive to relative rotational movement between said mounting ring and said coupling flange to regulate the axial interspacing of said coupling flange and said mounting ring, and a plurality of articulated clamps mounted on said spring plate, said clamps being movable between open and closed positions and having clamping surfaces arranged to confront said planar end face of said coupling flange in said closed position, said clamping and said coupling flange surfaces thus being adjustable by said cam means to grip a pipe flange of predetermined nominal thickness that can vary by the flexure of said spring plate.

2. Apparatus according to claim 1 wherein said cam means includes a plurality of face cams secured to said coupling flange and cam-receiving recesses formed in said mounting ring, said cam means having two effective positions according to the relative rotational positions of said mounting ring and said coupling flange, one position for maximum axial interspacing of said mounting ring and coupling flange and the other position for minimum axial interspacing, each of said positions corresponding to a nominal thickness pipe flange.

3. Apparatus according to claim 1 wherein the adjusted position of said clamp in closed clamping relation with a pipe flange flexes said spring plate to apply an initial tension force on said clamps, and wherein each of said clamps includes an over-center link, said link being arranged to increase the clamping pressure by additionally flexing said spring plate in response to a force tending to separate the pipe and coupling flanges.

4. Apparatus according to claim 3 and power means connected to said pivot plates for closing said clamp; an over-center link interconnecting each pivot plate with said clamp arm; a pair of spaced mounting plates rigidly connected to said spring plate and pivotally connected to said clamp arm, the respective pivotal interconnections being so interrelated that said over-center links rotate in one direction about their pivotal connections to said pivot plates when said clamp pad is moved by said power means into clamp-relation with said pipe flange, and said links tend to rotate about the same connections in the opposite direction in response to a force tending to separate said pipe flange and said coupling flange; and a stop block mounted on each of said pivot plates in the plane of each link to resist pivotal movement of the link in said opposite direction so that said clamp remains closed and locked when said power means is deenergized.

5. Apparatus according to claim 1 wherein each of said clamping surfaces is formed by an arcuate clamp pad elongate circumferentially of said coupling flange, and each clamp includes a clamp arm secured to said clamp pad intermediate the ends of said pad, a pair of spaced pivot plates straddling said clamp arm, and means defining a locking edge portion on each of said pivot plates, said edge portions being arranged to apply clamping pressure with the clamp in closed position to the otherwise ineffective end portions of said clamp pads to maximize the circumferential extent of the clamping pressure on the pipe flange.

6. Apparatus according to claim 2 including a tubular guide releasably mounted within said coupling member, said guide having a free end portion projecting outward beyond the planar end face of said coupling flange, said guide having a free edge diagonally related to its longitudinal axis and providing a smoothly rounded leading end lip portion which facilitates initial visual inspection of the concentric alignment of a pipe flange and said pipe coupling.

References Cited

UNITED STATES PATENTS 2,645,506    7/1953    Sturgis _____ 285—364 X (Other references on following page)

References Cited

| | | | |
|---|---|---|---|
| 2,834,504 | 5/1958 | Annicq | 220—46 |
| 3,346,281 | 10/1967 | Thompson | 285—320 X |

FOREIGN PATENTS

| | | |
|---|---|---|
| 1,475,341 | 2/1967 | France. |
| 314,569 | 7/1929 | Great Britain. |
| 854,763 | 11/1960 | Great Britain. |

DAVID J. WILLIAMOWSKI, Primary Examiner

DAVE W. AROLA, Assistant Examiner

U.S. Cl. X.R.

24—243, 248; 285—276, 308, 320, 364, 420